(12) United States Patent
Liao et al.

(10) Patent No.: US 7,044,642 B2
(45) Date of Patent: May 16, 2006

(54) GUIDING MODULE FOR ROLLING-ELEMENT

(75) Inventors: Chi-Meng Liao, Taichung (TW); Ya-Hui Liao, Taichung (TW)

(73) Assignee: Hiwin Technologies Corp., Taichung (TW)

(*) Notice: Subject to any disclaimer, the term of this patent is extended or adjusted under 35 U.S.C. 154(b) by 113 days.

(21) Appl. No.: 10/817,067

(22) Filed: Apr. 1, 2004

(65) Prior Publication Data
US 2005/0084188 A1 Apr. 21, 2005

(30) Foreign Application Priority Data
Oct. 16, 2003 (CN) .................. 92 1 28650

(51) Int. Cl.
*F16C 29/06* (2006.01)

(52) U.S. Cl. .......................... 384/45; 384/51

(58) Field of Classification Search .................. 384/51, 384/45, 520, 49; 74/424.88
See application file for complete search history.

(56) References Cited

U.S. PATENT DOCUMENTS 6,102,572 A * 8/2000 Hidano ..................... 384/45
6,116,783 A * 9/2000 Shirai et al. .............. 384/43
2005/0117820 A1* 6/2005 Chi-Meng et al. ........ 384/45

* cited by examiner

*Primary Examiner*—Thomas R. Hannon
(74) *Attorney, Agent, or Firm*—Charles E. Baxley

(57) ABSTRACT

The present invention relates to a guiding module for rolling-element, which is comprised of the partition and the link-ring. The characteristic of the guiding module for rolling-element is that has the rotatable structure, which uses the cooperation of pillar and trough, therefore can enhance the function of the guiding module for rolling-element to turn freely.

9 Claims, 7 Drawing Sheets

GUIDING MODULE FOR ROLLING-ELEMENT

BACKGROUND OF THE INVENTION

1. Field of the Invention

The present invention relates to a guiding module for rolling-element, and more particularly to a device for retaining rolling-element applied to linear transportation unit, the linear transportation unit is applied to machinery equipments, electronics, and automatic or semi conduction instruments.

2. Description of the Prior Arts

Conventional rolling-element retaining devices applied to linear transportation unit are generally divided into two categories: first one is an independent component rolling-element retaining device, and another one is a rolling-element retaining device made up of plural independent components. As shown in FIG. 7, wherein the slide block 60 is mounted onto a rail (not shown) and slides thereon, which is interiorly provided with a plurality of rolling elements 70 and between every two neighboring rolling elements 70 is inserted with a single partition 50 so as to prevent the rolling elements 70 from striking with each other. It is time-consuming to assemble this linear transportation unit by alternatively inserting the rolling element 70 and single partition 50 in the slide block 60. Furthermore, the partitions 50 and the rolling elements 70 should contact with each other properly, if the intervals between the rolling elements 70 and the partitions 50 are too big, the partitions 50 may be disengaged from the adjoining rolling elements 70 and it will collide the sidewall of the reflow passage when moving in the reflow path, and even worse that the reflow path may be jammed. On the other hand, if the distance between the rolling elements 70 and the partitions 50 is too tight, the rolling elements 70 are unable to smoothly move due to frictions produced between the rolling elements 70 and the partitions 50.

With reference to FIG. 8, which shows a rolling-element retaining device made up of plural independent components, wherein the rolling-element retaining device 51 is made up of plural independent partitions 511 linked together by a flexible link-ring 512, so as to confine the respective rolling elements 70 in the intervals between the neighboring partitions 511. The method of making this kind of rolling-element retaining device 51 is by putting the rolling elements 70 in a mould, and then made by plastic ejection moulding, the plastic material and the ejection moulding machine should be high quality, so the production cost is relatively increased. Furthermore, due to the special manufacturing method, the rolling-element retaining devices and the rolling elements are coupled with each other too closely, such that the rolling resistance of the respective rolling elements will be very big. Furthermore, the partitions are fixedly connected to the link-ring, the partitions are unable to rotate relative to the chain, such that this kind of rolling-element retaining device cannot smoothly move in a reflow path.

The present invention has arisen to mitigate and/or obviate the afore-described disadvantages of the conventional guiding module for rolling-element.

SUMMARY OF THE INVENTION

The primary object of the present invention is to provide a guiding module for rolling-element with good steering ability, which can enable the rolling elements to move smoothly in the reflow path.

The guiding module for rolling-element in accordance with the present invention is a retaining device for retaining the rolling elements. The retaining device changes the integral structure into a module structure made up of plural independent components, wherein the respective components are able to rotate with respect to each other, such that the rolling-element retaining device has a good steering performance.

Due to the guiding module for rolling-element in accordance with the present invention is a module structure made up of plural independent components, the respective components are simple structured and can be produced easily by ejection molding, and thus the production cost is substantially reduced.

Furthermore, the respective components of the guiding module for rolling element in accordance with the present invention are rotatable relative to each other, by virtue of the cooperation of the pillar structure and the trough, the steering ability of the guiding module for rolling element is substantially improved. Thereby the guiding module for rolling element in accordance with the present invention can enable the rolling elements to move smoothly in the reflow path.

In addition, the separations of the guiding module in accordance with one aspect of the present invention can be formed in the shape of a cylinder, a triangle column or a polygonal column. And the trough structure on the partition can be in form of a trough with curved bottom. With the cooperation of the pillar structure and the trough, the guiding module for rolling element of the present invention is provided with good steering ability, and thus it can move smoothly in the reflow path.

And the respective components of the present invention can be made of wear-resistant and flexible materials, so as to improve the steering performance and prolong the service life of the guiding module for rolling element of the present invention.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENTS

Figure 1:
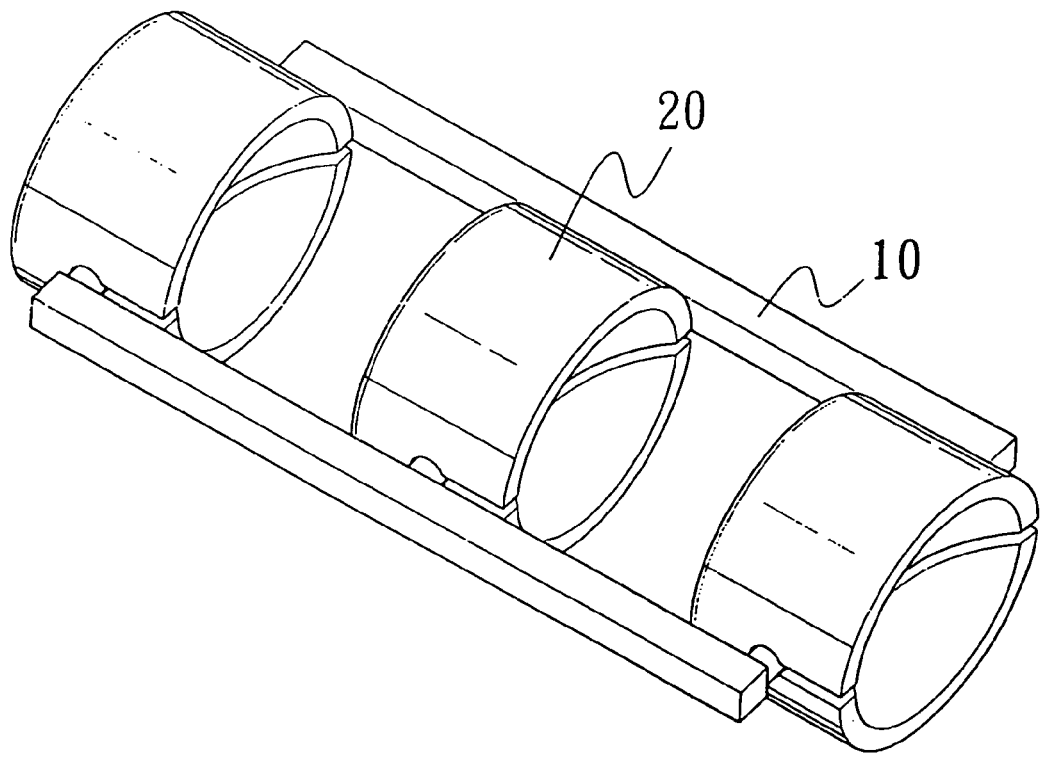
FIG. 1 is a perspective view of a guiding module for rolling-element in accordance with a first embodiment of the present invention.

FIG. 1 is a perspective view of a guiding module for rolling-element in accordance with a first embodiment of the present invention, wherein the guiding module for rolling-element generally comprises partitions 20 and link-ring 10. The spaces between the partitions 20 and the link-ring 10 are provided for retaining rolling elements (not shows). After the rolling elements are received in the spaces, the partitions 20 can be firmly positioned on the link-ring 10, and the rolling elements will be separated from each other by the partitions 20 and the frictions are accordingly reduced, such that the rolling elements can move smoothly.

Figure 2:
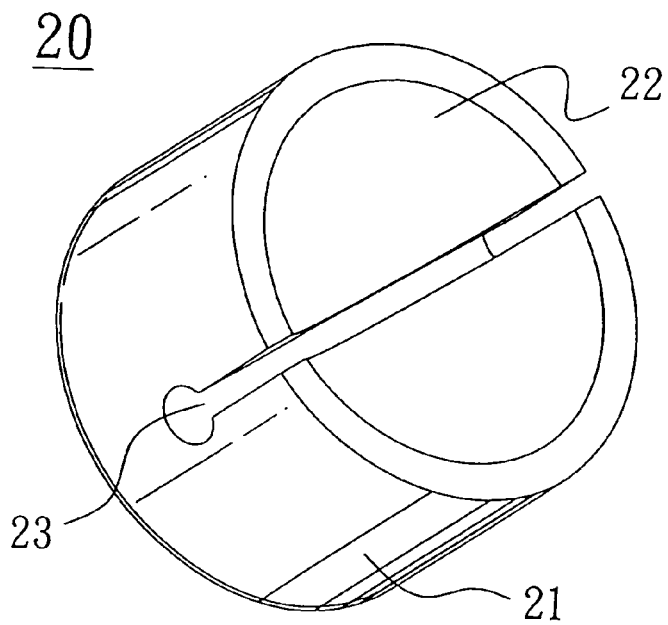
FIG. 2 is an amplified view of the partition in FIG. 1.

FIG. 2 is an amplified view of the partition in FIG. 1, wherein both end surfaces of a base body 21 of the respective partitions 20 are formed with a curved surface 22 with a specified curvature corresponding to the curvature of the rolling elements (not shown). On the curved surface 22 of an end surface of the base body 21 is formed with coupling trough 23, such that the partitions 20 can be connected to the link-ring 10, so as to form a guiding module for rolling-element. Furthermore, the coupling trough 23 has a curved bottom, such that the partitions 20 are able to rotate when moving along the reflow path.

Figure 3:
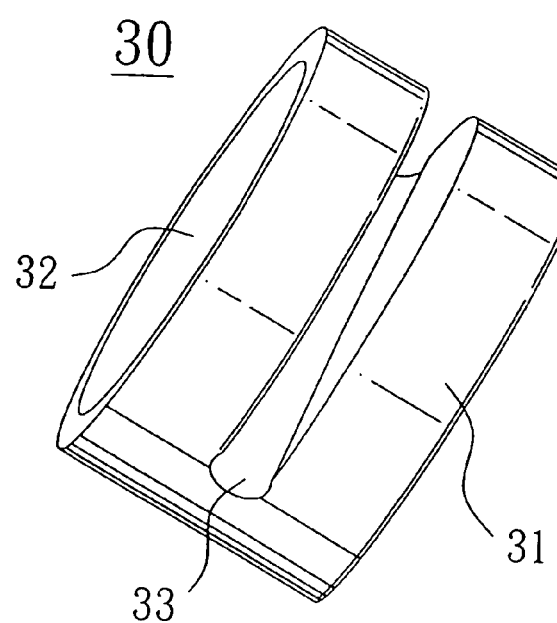
FIG. 3 is a perspective view of a partition in accordance with a second embodiment of the present invention.

FIG. 3 is a perspective view of a partition in accordance with a second embodiment of the present invention, wherein both end surfaces of a base body 31 of the partitions 30 are formed with a curved surface 32 with a specified curvature corresponding to the curvature of the rolling element (not shown). The distinctive characteristic of the partitions 30 in this embodiment comparing with the partition in FIG. 2 is that the coupling trough 33 is defined in the side surface of the base body 31 and not on the curved end surface 32, and alike, the partitions 30 can be connected to the link-ring 10 so as to form a guiding module for rolling-element. The partitions 30 in this embodiment can be easily assembled and disassembled.

Figure 4:
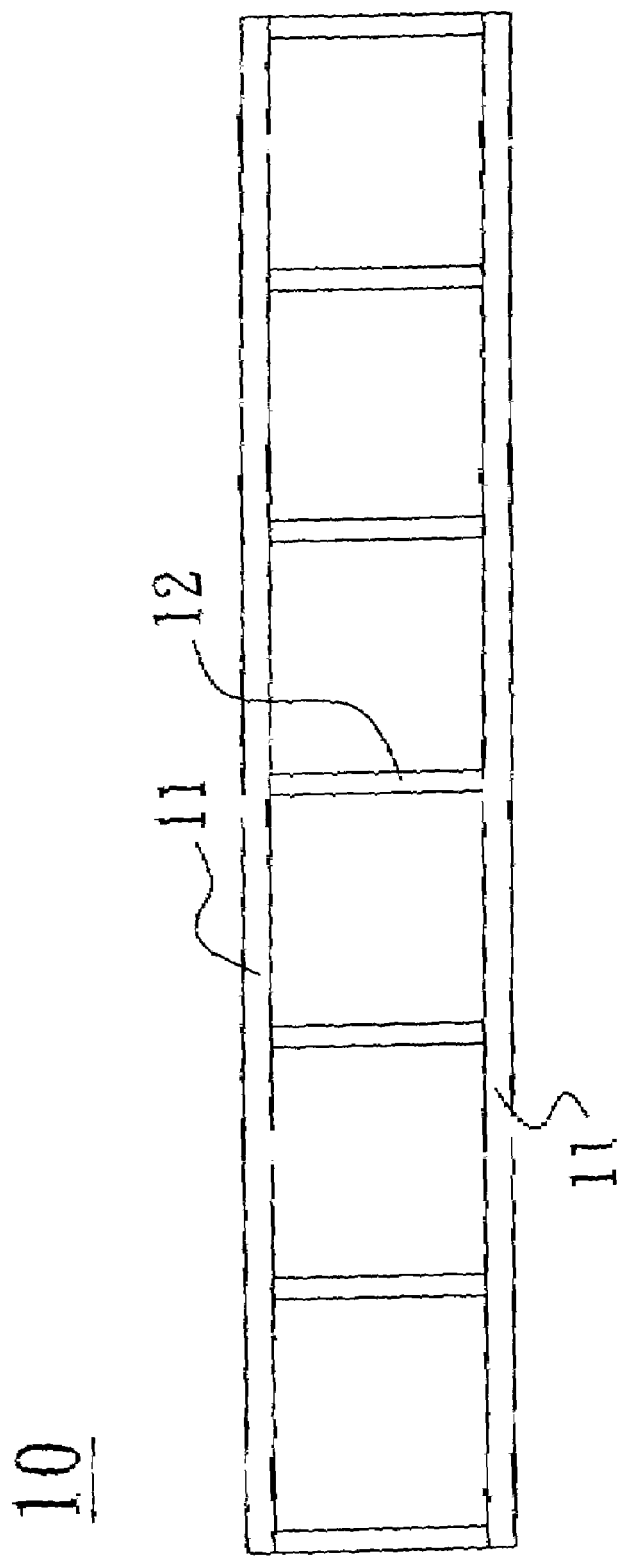
FIG. 4 is a plan view of the link-ring in FIG. 1.

FIG. 4 is a plan view of the link-ring in FIG. 1, wherein the link-ring 10 is long-strip structured, which is ladder-structured and comprised of band-like coupling members 11 and pillar-like separations 12. The coupling members 11 are used to connect the separations 12. In this embodiment, the coupling members 11 are connected to both ends of the separations 12, such that the positionability of the separations 12 is improved, and thus the spaces between the separations 12 and the coupling members 11 of the link-ring 10 wouldn't be deformed, extended or shrank.

Figure 5:
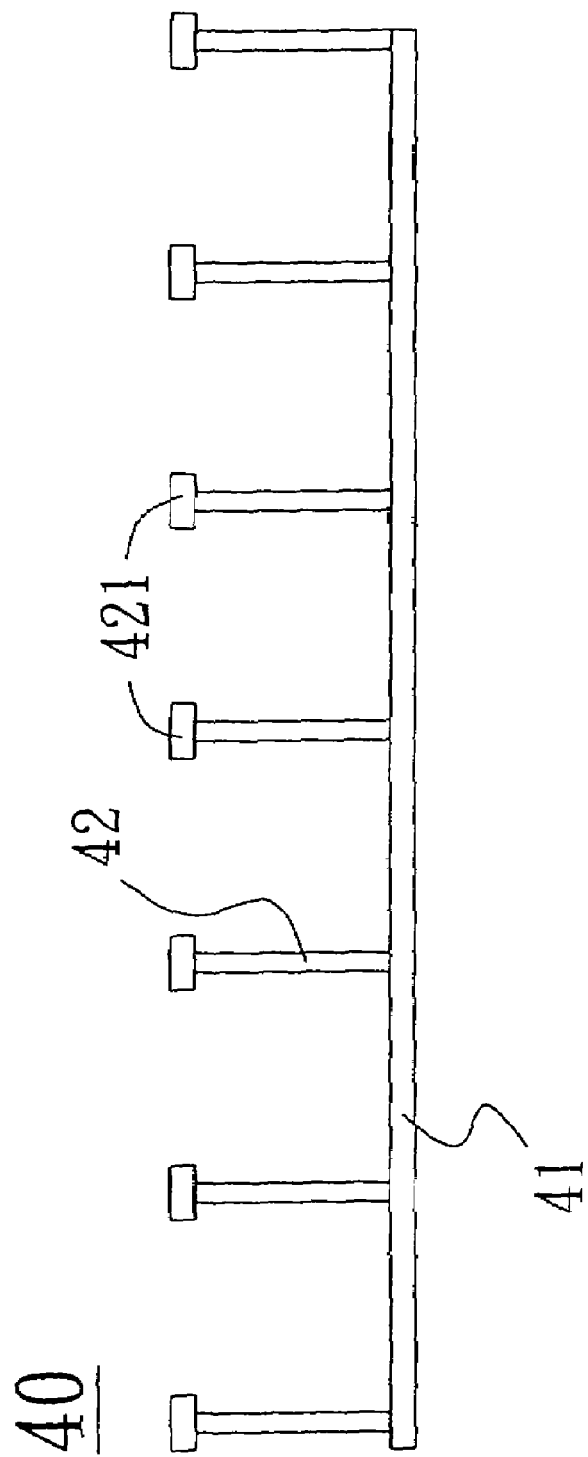
FIG. 5 is a perspective view of a link-ring in accordance with a second embodiment of the present invention.

FIG. 5 is a perspective view of a link-ring in accordance with a second embodiment of the present invention, wherein the link-ring 40 comprises a band-like coupling member 41 and pillar-like seperations 42. The main distinction of the link-ring 40 in this embodiment is that the coupling member 41 is only connected to one end of the pillar-like separations 42, such that the separations 42 are provided with great oscillating flexibility during movement, and the space adjustability for the spaces between the separations 42 for retaining the rolling elements is secured. Thereby the guiding module in this embodiment can be applied to complicated reflow path for rolling-element. To prevent the disengagement of the partitions 20 or 30 from the non-connecting end of the separations 42, a block 421 can be defined on another end of the coupling member 41.

Figure 6:
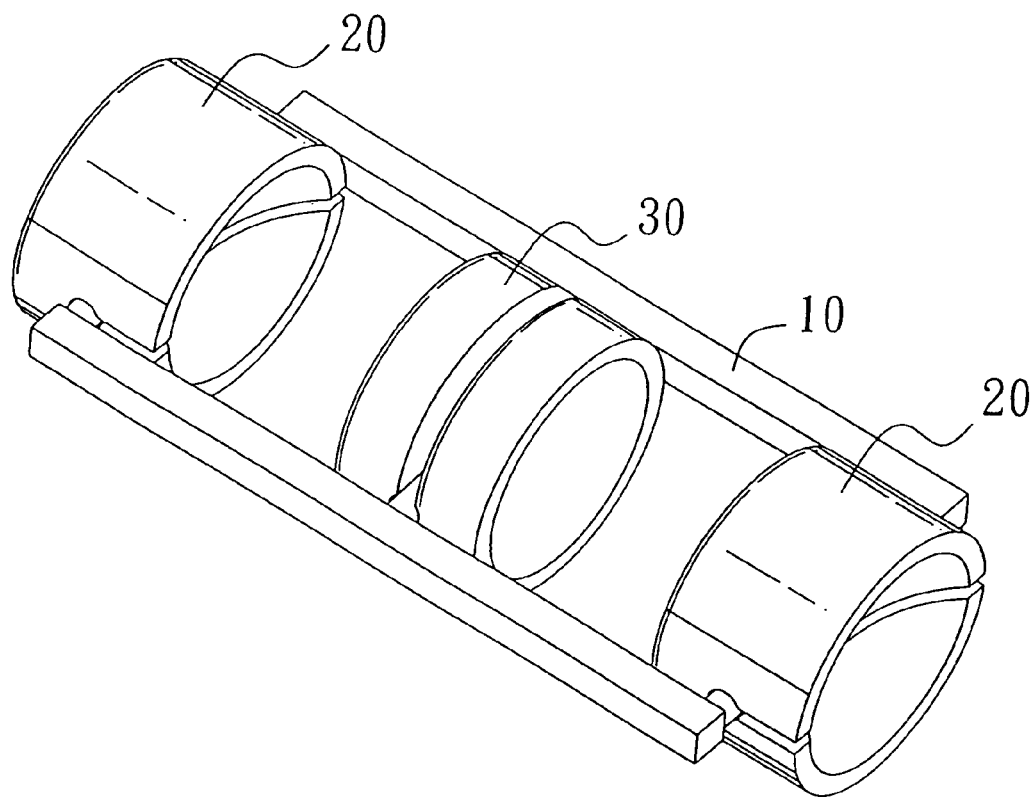
FIG. 6 is perspective view of a guiding module for rolling-element in accordance with a second embodiment of the present invention.
Figure 7:
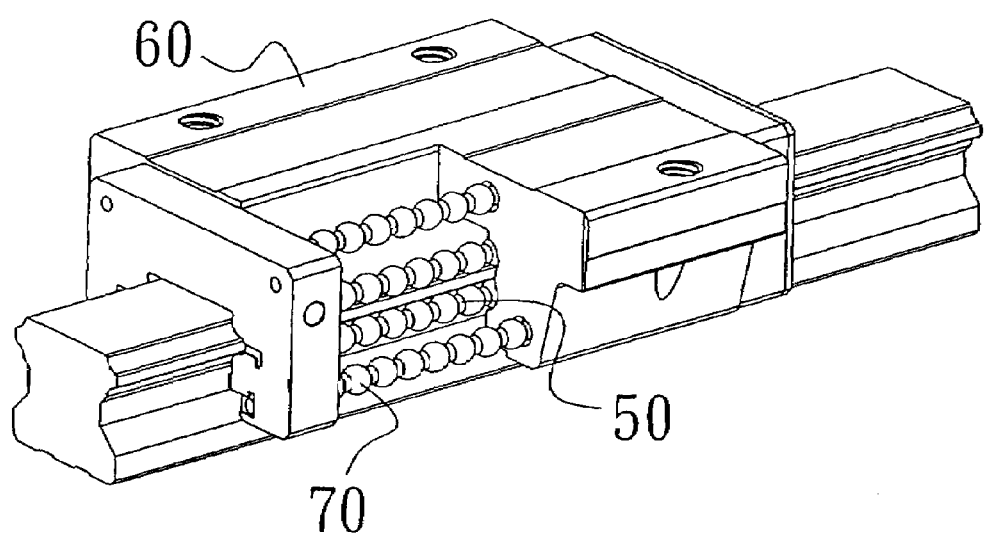
FIG. 7 is a perspective view of a conventional rolling-element retaining device.
Figure 8:
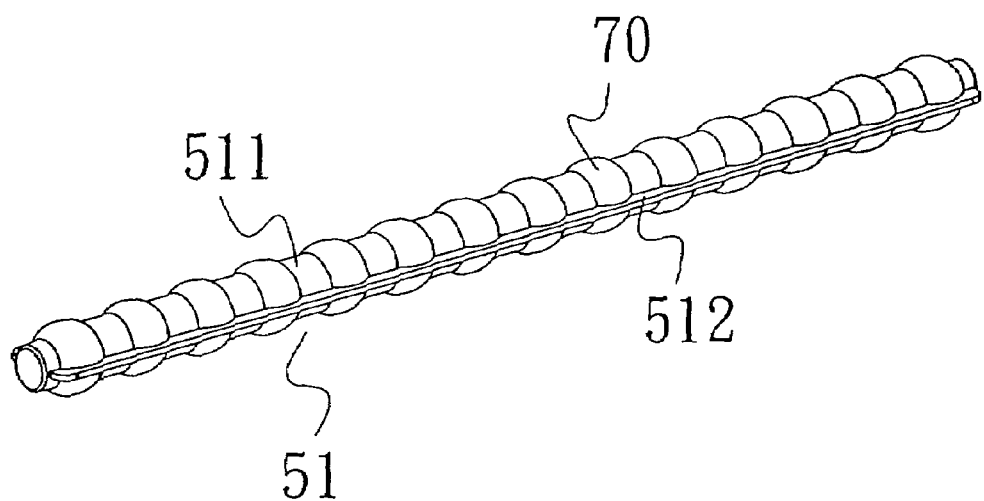
FIG. 8 is a perspective view of another conventional rolling-element retaining device.

FIG. 6 is perspective view of a guiding module for rolling-element in accordance with a second embodiment of the present invention, wherein the guiding module for rolling-element generally comprises the partitions 20 and 30 that are linked with the link-ring 10. The main distinction of this embodiment is that the partitions 20 and 30 are alternatively connected to the link-ring 10, the structure of the guiding module for rolling-element in this embodiment enables the guiding module to be assembled and disassembled easily. The link-ring 10 in the second embodiment can be replaced by the link-ring 40, such that the space adjustability for the spaces between the separations for retaining the rolling elements is secured, and thus the guiding module can be applied to complicated reflow path for rolling-element.

While we have shown and described various embodiments in accordance with the present invention, it should be clear to those skilled in the art that further embodiments may be made without departing from the scope of the present invention.

What is claimed is:

1. A guiding module for rolling-element comprising:
    partitions employed to separate the rolling elements from each other, both end surfaces of the partitions formed with a curved surface with a curvature corresponding to the curvature of the rolling element;
    link-ring which is a strip-structure comprised of band-liked coupling members and pillar-liked separations, the coupling members employed to connect the separations;
    wherein each partition is provided with a coupling trough which can receive and rotate relative to the separation.

2. The guiding module for rolling-element as claimed in claim 1, wherein the coupling trough is formed on the curved surface of an end of the respective partitions, such that the partitions can be connected to the link-ring to form a guiding module for rolling-element.

3. The guiding module for rolling-element as claimed in claim 1, wherein the coupling trough is formed on side surface of the respective partitions, such that the partitions can be connected to the link-ring to form a guiding module for rolling-element.

4. The guiding module for rolling-element as claimed in claims 1, 2 or 3, wherein the coupling trough of the partitions has a curved bottom, such that the partitions are able to rotate when they move along the reflow path.

5. The guiding module for rolling-element as claimed in claim 1, wherein the band-like coupling members are connected to both ends of the pillar-like separations, such that the positionability of the separations is improved, and thus the spaces between the separations and the coupling members wouldn't be deformed, extended or shrank.

6. The guiding module for rolling-element as claimed in claim 1, wherein the coupling members are connected to one end of the pillar-like separations, such that the separations are provided with great oscillating flexibility during movement, and the space adjustability for the spaces between the separations for retaining the rolling elements is secured, this guiding module can be applied to complicated reflow path for rolling-element.

7. The guiding module for rolling-element as claimed in claims 1, 5 or 6, wherein the separations are cylinder shaped.

8. The guiding module for rolling-element as claimed in claims 1, 5 or 6, wherein the separations are formed in the shape of a triangle column.

9. The guiding module for rolling-element as claimed in claims 1, 5 or 6, wherein the separations are formed in the shape of a polygonal column.

* * * * *